Jan. 3, 1933.  L. H. HOUNSFIELD  1,892,799
GRAPH RECORDING APPARATUS
Filed Oct. 21, 1931

Inventor:
Leslie Haywood Hounsfield,
By Byrnes, Stebbins, Parmelee & Blenko,
attys.

Patented Jan. 3, 1933  1,892,799

UNITED STATES PATENT OFFICE

LESLIE HAYWOOD HOUNSFIELD, OF LONDON, ENGLAND

GRAPH-RECORDING APPARATUS

Application filed October 21, 1931, Serial No. 570,242, and in Great Britain March 25, 1931.

This invention relates to apparatus for facilitating the production of graph records of the results of tests, observations and the like, in which one of two interdependent variables is altered by means involving a positive mechanical movement and the other variable is determined by reading off the position of an indicator on a scale or the like.

The invention is applicable, for instance, to use in connection with the tensile testing machine described in British patent specification No. 320,704 wherein the specimen under test is strained by the positive movement of a lever and wherein the corresponding load is determined by reading the position of a fluid indicator in a capillary tube against a suitably disposed graduated scale.

The mechanism determining the successive alteration in one variable may be arranged to give a movement suitable in magnitude for the graph paper or card and where the movement of the index of the other variable is suitable, then the index may be followed with a hand operated cursor so connected mechanically to the reading apparatus as to give the corresponding movement on the graph paper or card. This condition obtains in the case of the above-mentioned testing machine because the index fluid moving in a straight capillary tube can be followed by a cursor movable in a straight line to a scale suitable for a graph record.

If however it is not feasible to follow directly the index as for example in tests involving:—(a) a very small movement observed with a microscope, (b) a very large movement such as a light spot on a screen, or (c) a movement not in a straight line as the movement of a clock hand, then a straight scale of a size suited to the dimension of the graph is prepared and is graduated to correspond with the observed scale such that observations read off the actual index scale may be transferred to the prepared scale with the hand cursor.

The card to receive the graph may, if desired, be secured to a rectangular frame such that the positive movement moves the whole card and the cursor movement operates a pencil, style, or the like. The card is preferably, however, placed round a drum or cylinder, which is caused to rotate by the positive movement, and the cursor, as it is moved along its scale is arranged to move a pencil or style parallel to the axis of the cylinder.

In the accompanying drawing.

Like reference numeral indicate like parts throughout the drawing.

Figure 1:
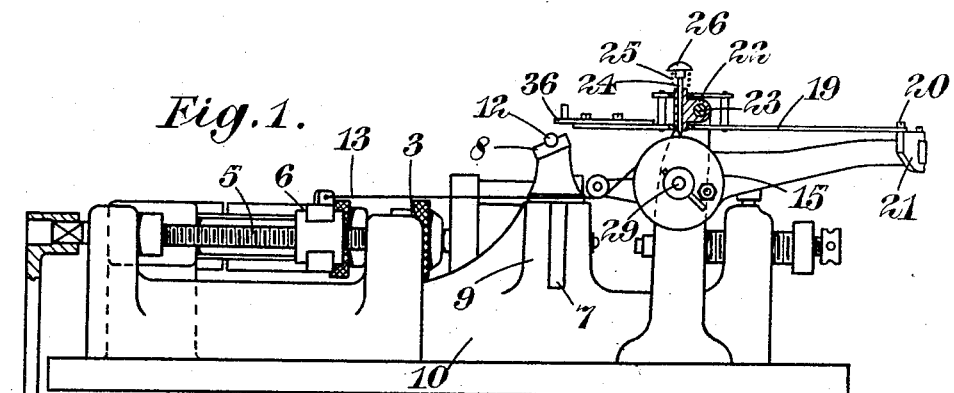
Figures 1 and 2 represent, in elevation and plan, this invention applied to the testing machine described in British patent specification No. 320,704.

The following detailed description and the drawing are by way of example and show one method of carrying out this invention.

Figure 2:
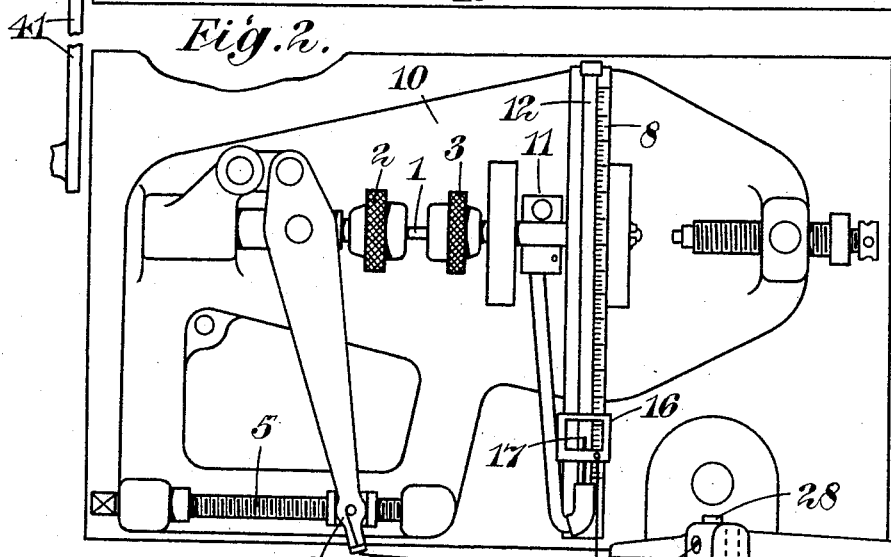

In Figures 1 and 2, 1 is the specimen of steel being tested, the ends of which are held in the jaws 2 and 3 of the aforementioned steel testing machine.

The handle 41 revolves a screw 5 which moves one end 6 of the lever such that a great force can be exerted on the jaws 2 which force produces a tensile stress in the specimen 1.

The jaws 3 are attached to the centre of a spring beam 7 which lies under a graduated scale 8 and the ends of the spring beam are held by buttresses 9 which form part of the rigid base 10. The deflection of the spring 7 varies with the force on the specimen and this deflection moves a piston in a cylinder 11 to displace mercury into a capillary tube 12 and it will be appreciated that the force on the specimen is indicated by the position of the mercury column and can be read off on the graduated scale.

To prepare a stress-strain diagram it is necessary to produce a curve showing how the movement of the mercury in the capillary tube—which movement is proportional to stress—varies with the movement of the end of the lever 6—the latter movement being substantially proportional to strain.

A cord 13 or the equivalent attached to the lever end 6 passes round and is secured to a pulley 14 at the end of a drum 15 and the parts are arranged so that movement of the lever end causes the cylinder to revolve in a direction contrary to the action of an internal spring.

A cursor 16, capable of being slid over the graduated scale 8 until its pointer or "cross wire" coincides with the end of the mercury column 17, is connected by a link 18 to the lever 19. One end 20 of the lever 19 is constrained, by means of a radius arm 21 or the usual slot mechanism, to move only at right angles to the axis of the drum 15 or substantially at right angles to that axis. At another place on the lever 19 is a trunnion bracket 22 pin-jointed to the lever 19 and constrained by the rod 23 to move in a line parallel to the axis of the drum 15. The trunnion pin has an axial hole in which is a style 24. The style is held in the position shown by the spring 25 and it can be depressed by pressure on the pad 26.

The method of operation is as follows:—A card or piece of suitable graph paper is secured in the usual manner to the drum, the mercury column is adjusted to zero, the specimen to be tested is placed in position and the handle 41 turned until all slack is taken up as indicated by the mercury beginning to move from zero, then the style 26 is set to its zero by the two following adjustments:—

(1) The drum is caused to rotate till the style comes to the zero or base line of "extension" by adjusting the length of the cord at the eye 6 or by means of a turn-buckle, and (2) The set screw 27 is slackened while the spindle 28, 29 is moved axially till the style comes to the zero or base line of "stress".

The pad 26 is then depressed and the style should mark the card at the intersection of the base lines. The cursor is then moved to, say, the 1 ton graduation, the handle 41 turned until the mercury agrees with the cursor position and the style depressed again, to record the next point on the graph. This process is repeated till the specimen fractures.

If the style were a pencil held in contact with the card the cursor would have to be kept in agreement with the end of the mercury column, but as this is not convenient the style is held off the card and depressed only when agreement is observed.

Figure 3:
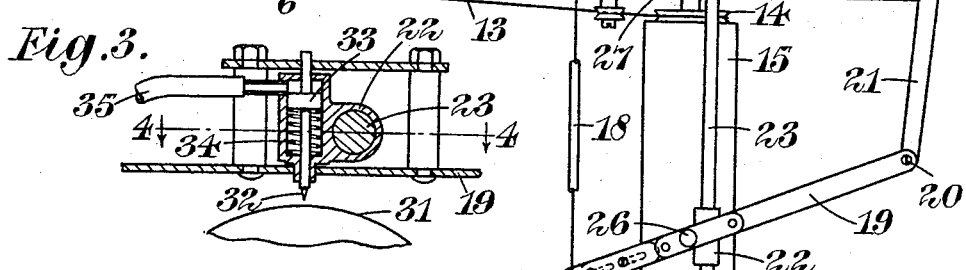
Figures 3 and 4 represent, in sectional elevation and plan, an alternative form of card puncturing device which is operated pneumatically, Figure 4 being a sectional view taken on the line 4—4 of Figure 3.
Figure 4:
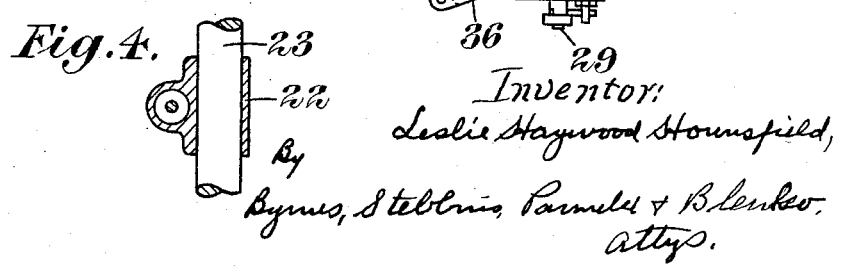

The depression of the style may be done with the finger or pneumatically by the modified device represented in Figures 3 and 4 where 31 is the graph paper on a portion of the drum and 32 is the style. The latter is attached to a piston 33 which descends against the action of a spring 34 when air is driven through the flexible tube 35. The numbering of the other parts in these figures indicates their disposition as shown in Figures 1 and 2.

If desired, the depression of the style may be effected electro-magnetically, either by pressing a switch key with the finger or by making the mercury column itself complete the electric circuit. In this last case the battery current may be brought to the cursor or its equivalent which may be rigidly attached to a wire passing down the capillary tube from the open or free end.

The method of operation in the last case is as follows:—The observer watches the style instead of the mercury column. Every time the style is seen to go down the cursor is moved till the style lifts. Then the handle 41 is turned till the style goes down again, and so on.

The lever 19 is provided with an adjustment at 36 which enables its length to be so varied that a true co-relation may be obtained between the graduated scale and the marking on the graph paper.

In applying this invention to apparatus in which it is not feasible to make a cursor follow the indicator as in the cases (*a*) (*b*) and (*c*) already mentioned, then the cursor may be made to slide over a straight graduated scale such as 8 in Figure 2, and its reading made to agree with the reading shown in the index which cannot be followed directly.

I claim:

1. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a movable support for sheet material on which the graph is to be recorded, and a recording tool movable across the said support for recording the graph, with the said movable support and recording tool connected one to be moved in one direction in proportion to changes in the first said variable and the other to be moved in another direction in proportion to movements of the said cursor, which two directions are such as to determine the formation of the graph.

2. Graph recording apparatus for use with a scientific measuring instrument provided with positive mechanical means for altering one of two interdependent variables and with an indicator and scale for showing resultant alterations in the other variable, which apparatus comprises a manually adjustable cursor adapted to be moved to positions corresponding to positions of the said indicator, a movable support for sheet material on which the graph is to be recorded, and a recording tool movable across the said support for recording the graph, with the said movable support and recording tool connected one to be moved in one direction in proportion to changes in the first said variable and the other to be moved in another direction in proportion to movements of the said cursor, which two directions are such as to determine the formation of the graph.

3. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a movable support for sheet material on which the graph is to be recorded, and a recording tool movable across the said support for recording the graph, with the said movable support connected to the said positive mechanical means to be moved by the latter in one direction and with the recording tool connected to the said cursor to be moved thereby in another direction, which two directions are such as to determine the formation of the graph.

4. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a movable support for sheet material on which the graph is to be recorded, and a recording tool movable across the said support for recording the graph, with the said movable support and recording tool connected one to the said positive mechanical means to be moved by the latter in one direction and the other by adjustable linkwork to the said cursor to be moved thereby in another direction, which two directions are such as to determine the formation of the graph.

5. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a movable support for sheet material on which the graph is to be recorded, and a recording tool movable across the said support for recording the graph, with the said movable support connected to the said positive mechanical means to be moved by the latter in one direction and with the recording tool connected by adjustable linkwork to the said cursor to be moved thereby in another direction which two directions are such as to determine the formation of the graph.

6. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a movable support for sheet material on which the graph is to be recorded, and a recording tool movable across the said support for recording the graph and adapted to mark the said sheet material only at intervals, with the said movable support and recording tool connected one to be moved in one direction in proportion to changes in the first said variable and the other to be moved in another direction in proportion to movements of the said cursor, which two directions are such as to determine the formation of the graph.

7. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a movable support for sheet material on which the graph is to be recorded, and a recording tool movable across the said support for recording the graph, and adapted to mark the said sheet material only at intervals, with the said movable support connected to the said positive mechanical means to be moved by the latter in one direction and with the recording tool connected to the said cursor to be moved thereby in another direction, which two directions are such as to determine the formation of the graph.

8. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a movable support for sheet material on which the graph is to be recorded, and a recording tool movable across the said support for recording the graph and adapted to mark the said sheet material only at intervals and at the will of the operator, with the said movable support and recording tool connected one to be moved in one direction in proportion to changes in the first said variable and the other to be moved in another direction in proportion to movements of the said cursor, which two directions are such as to determine the formation of the graph.

9. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a movable support for sheet material on which the graph is to be recorded, and a recording tool supported in a raised position and movable across the said support for recording the graph and adapted to be depressed by hand to mark the said sheet material only at intervals, with the said movable support and recording tool connected one to be moved in one direction in proportion to changes in the first said variable and the other to be moved in another direction in proportion to movements of the said cursor, which two directions are such as to determine the formation of the graph.

10. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a movable support for sheet material on which the graph is to be recorded, and a recording tool supported in a raised position and movable across the said support for recording the graph and adapted to be depressed by pneumatic means to mark the said sheet material only at intervals, with the said movable support and recording tool connected one to be moved in one direction in proportion to changes in the first said variable and the other to be moved in another direction in proportion to movements of the said cursor, which two directions are such as to determine the formation of the graph.

11. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a rotatable roller for supporting sheet material on which the graph is to be recorded, and a recording tool movable across the said roller, for recording the graph, with the said roller connected to be rotated in one direction and the said recording tool connected to be moved in another direction, one in proportion to changes in the first said variable and the other in proportion to movements of the said cursor, which two directions are such as to determine the formation of the graph.

12. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a rotatable roller for supporting sheet material on which the graph is to be recorded, and a recording tool movable across the said roller, for recording the graph, with the said roller connected to the said positive mechanical means to be rotated by the latter in one direction, and with the recording tool connected to the said cursor to be moved thereby in another direction, which two directions are such as to determine the formation of the graph.

13. Graph recording apparatus for use with a scientific measuring instrument provided with positive mechanical means for altering one of two interdependent variables and with an indicator and scale for showing resultant alterations in the other variable, which apparatus comprises an adjustable cursor adapted to be moved to positions corresponding to positions of the said indicator, a rotatable roller for supporting sheet material on which the graph is to be recorded, a recording tool movable across the said roller, for recording the graph, a lever pivoted at one end to a fixed part so that its other end swings approximately at right angles to the axis of the roller, a link pivoted to the said second end of the lever, a plate adjustably mounted on said link, and a support for the recording tool carried by a slide extending parallel to the axis of the roller, with the support for the recording tool pivoted to the said link, and with the said roller connected to be rotated in one direction and the said adjustable plate connected to be moved in a direction to displace the recording tool across the roller, one by the said positive mechanical means and the other by the said cursor, which directions are such as to determine the formation of the graph.

14. In testing instruments for measuring the yield point, maximum tensile stress, breaking stress of specimens of steel and other materials, and having positive mechanical means for altering one of two interdependent variables, the use in combination of a stiff spring which deflects in proportion to the load applied, a multiplying index mechanism to enable the comparatively small deflection to be accurately determined, which multiplying index mechanism consists of a fluid gauge comprising an operating piston fitted to avoid appreciable leak and so that it operates substantially at atmospheric pressure and without damping action on the movements of the spring following fracture of the specimen, the said fluid gauge containing gauge fluid which is adapted to be displaced to cause the end of a column of liquid to move in a relatively small bore tube, and graph recording apparatus comprising an adjustable cursor adapted to be moved to positions corresponding to positions of the said end of the said column of liquid, a movable support for sheet material on which the graph is to be recorded, and a recording tool movable across the said support for recording the graph with the said movable support and recording tool connected one to be moved in one direction in proportion to changes in the first said variable and the other to be moved in another direction in proportion to movements of the said cursor, which two directions are such as to determine the formation of the graph.

In testimony whereof I affix my signature.

LESLIE HAYWOOD HOUNSFIELD.